United States Patent
Bruno

(10) Patent No.: US 10,994,848 B2
(45) Date of Patent: May 4, 2021

(54) ENVIRONMENTAL CONTROL SYSTEM FOR AN AIRCRAFT

(71) Applicant: Hamilton Sundstrand Corporation, Charlotte, NC (US)

(72) Inventor: Louis J. Bruno, Ellington, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 170 days.

(21) Appl. No.: 16/358,290

(22) Filed: Mar. 19, 2019

(65) Prior Publication Data

US 2020/0298981 A1    Sep. 24, 2020

(51) Int. Cl.
    B64D 13/06 (2006.01)
(52) U.S. Cl.
    CPC ...... *B64D 13/06* (2013.01); *B64D 2013/0618* (2013.01); *B64D 2013/0648* (2013.01); *B64D 2013/0662* (2013.01)
(58) Field of Classification Search
    CPC ............ B64D 13/06; B64D 2013/0618; B64D 2013/0648; B64D 2013/0662; B64D 13/02; B64D 2013/0611
    USPC .......................................................... 62/116
    See application file for complete search history.

(56) References Cited

U.S. PATENT DOCUMENTS

| | | | |
|---|---|---|---|
| 4,374,469 A * | 2/1983 | Rannenberg | B64D 13/06 62/172 |
| 5,299,763 A | 4/1994 | Bescoby et al. | |
| 5,461,882 A | 10/1995 | Zywiak | |
| 6,427,471 B1 * | 8/2002 | Ando | B64D 41/00 62/402 |
| 9,669,936 B1 | 6/2017 | Fiterman et al. | |
| 9,878,794 B2 | 1/2018 | Bruno | |
| 10,144,517 B2 | 12/2018 | Bruno et al. | |
| 2001/0004837 A1 * | 6/2001 | Sauterleute | B64D 13/06 62/402 |
| 2017/0341759 A1 | 11/2017 | Bruno et al. | |
| 2017/0341760 A1 * | 11/2017 | Hall | B64D 13/02 |
| 2017/0341764 A1 | 11/2017 | Bruno et al. | |
| 2017/0342838 A1 | 11/2017 | Bruno et al. | |
| 2018/0215474 A1 | 8/2018 | Defrancesco et al. | |

FOREIGN PATENT DOCUMENTS

| | | |
|---|---|---|
| EP | 2886462 A1 | 6/2015 |
| EP | 3235728 A1 | 10/2017 |
| EP | 3249196 A1 | 11/2017 |

OTHER PUBLICATIONS

Extended European Search Report; International Application No. 19211134.2-1010; International Filing Date: Nov. 25, 2019; dated Jul. 6, 2020; 83 pages.

* cited by examiner

*Primary Examiner* — Steve S Tanenbaum
(74) *Attorney, Agent, or Firm* — Cantor Colburn LLP

(57) ABSTRACT

An environmental control system of an aircraft includes a compressing device having a compressor configured to receive a first flow of a medium and a turbine configured to receive the first flow of the medium and a distinct second flow of the medium. A dehumidification system is arranged in fluid communication with the turbine. A valve is configured to divert the second flow around the turbine and an inlet port is arranged in fluid communication with the compressor, the turbine, and the dehumidification system.

18 Claims, 1 Drawing Sheet

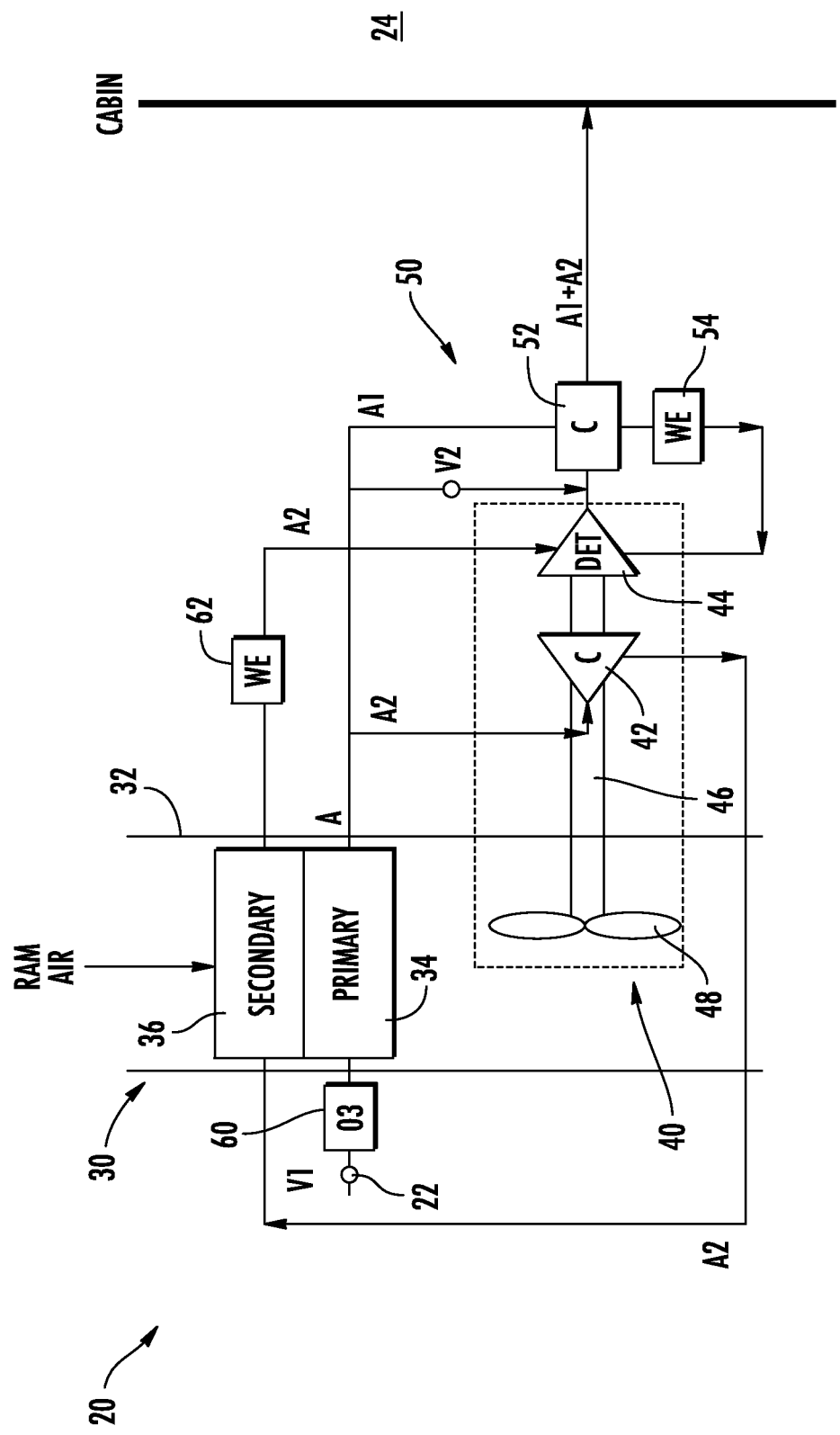

ENVIRONMENTAL CONTROL SYSTEM FOR AN AIRCRAFT

BACKGROUND

Embodiments of the disclosure relate to environmental control systems, and more specifically to an environmental control system of an aircraft.

Today's air condition systems are supplied pressure that is approximately 30 psig to 35 psig. The energy in the bleed air, in the form of pressure, has is typically applied to either ram air via the ACM fan, the bleed air via the ACM compressor, or to both. A new approach applies the energy in the bleed to only a portion of the bleed air.

BRIEF DESCRIPTION

According to one or more embodiments, an environmental control system of an aircraft includes a compressing device having a compressor configured to receive a first flow of a medium and a turbine configured to receive the first flow of the medium and a distinct second flow of the medium. A dehumidification system is arranged in fluid communication with the turbine. A valve is configured to divert the second flow around the turbine and an inlet port is arranged in fluid communication with the compressor, the turbine, and the dehumidification system.

In addition to one or more of the features described above, or as an alternative, in further embodiments the second flow of medium is bleed air.

In addition to one or more of the features described above, or as an alternative, in further embodiments the bleed air is provided from at least one of an engine and an auxiliary power unit of the aircraft.

In addition to one or more of the features described above, or as an alternative, in further embodiments a third flow of the medium supplied via the inlet port is separated into the first flow and the second flow within the environmental control system, the first flow being supplied to the compressor and the second flow being supplied to the turbine.

In addition to one or more of the features described above, or as an alternative, in further embodiments the turbine has a first inlet and a second inlet, the first inlet receiving the first flow and the second inlet receiving the second flow.

In addition to one or more of the features described above, or as an alternative, in further embodiments the first flow mixes with the second flow at an exit of the turbine.

In addition to one or more of the features described above, or as an alternative, in further embodiments the dehumidification system is positioned upstream from the second inlet of the turbine.

In addition to one or more of the features described above, or as an alternative, in further embodiments the environmental control system is operable in a plurality of modes including a first mode and a second mode.

In addition to one or more of the features described above, or as an alternative, in further embodiments the environmental control system is operable in the first mode when an ambient temperature is at or above a design point of the environmental control system.

In addition to one or more of the features described above, or as an alternative, in further embodiments the environmental control system is operable in the second mode when an ambient temperature is below a design point of the environmental control system.

In addition to one or more of the features described above, or as an alternative, in further embodiments the valve is in a closed position during operation in the first mode and the valve is in an open position during operation in the second mode.

In addition to one or more of the features described above, or as an alternative, in further embodiments comprising a ram air circuit including a ram air shell having at least one heat exchanger positioned therein.

In addition to one or more of the features described above, or as an alternative, in further embodiments the medium is separated into the first flow and the second flow downstream from the at least one heat exchanger.

In addition to one or more of the features described above, or as an alternative, in further embodiments the compressing device includes a fan operably coupled to the compressor and the turbine via a shaft, the fan being arranged in fluid communication with the ram air circuit.

In addition to one or more of the features described above, or as an alternative, in further embodiments a mixture of the flow of the first medium and the flow of the second medium is provided to a load, and the valve is operable to control a temperature of the mixture of the flow of the first medium and the flow of the second medium provided to the load.

According to another embodiment, a method of operating an environmental control system of an aircraft includes providing a compressing device including a compressor and a turbine, providing a flow of medium to the environmental control system, separating the flow of medium into a first portion and a second portion and providing the first portion of the air to the compressor and the turbine sequentially. In a first mode of operation, the first portion and the second portion of the flow of medium mix within the turbine and in a second mode of operation the second portion bypasses the turbine such that the first portion and the second portion of the flow of medium mix downstream from the turbine.

In addition to one or more of the features described above, or as an alternative, in further embodiments the environmental control system is transformed from the first mode of operation to the second mode of operation by opening a bypass valve.

In addition to one or more of the features described above, or as an alternative, in further embodiments a temperature of the mixture of the first medium and the second medium generated in the first mode of operation is cooler than a temperature of the mixture of the first medium and the second medium generated in the second mode of operation.

In addition to one or more of the features described above, or as an alternative, in further embodiments the flow of medium provided to the environmental control system is bleed air drawn from an engine of the aircraft.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The following descriptions should not be considered limiting in any way. With reference to the accompanying drawings, like elements are numbered alike:

The FIGURE is a simplified schematic of a portion of an environmental control system according to one embodiment.

DETAILED DESCRIPTION

A detailed description of one or more embodiments of the disclosed apparatus and method are presented herein by way of exemplification and not limitation with reference to the FIGS.

With reference now to the FIGURE, a schematic diagram of an environment control system (ECS) 20 is depicted according to a non-limiting embodiment. Although the environmental control system 20 is described with reference to an aircraft, alternative applications are also within the scope of the disclosure. As shown in the FIGURE, the environmental control system 20 receives a medium A at an inlet 22 and provides a conditioned form of the medium A to a volume 24. In embodiments where the environmental control system 20 is used in an aircraft application, the medium A is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The environmental control system 20 includes a RAM air circuit 30 including a shell or duct, illustrated schematically at 32, within which one or more heat exchangers are located. The shell 32 can receive and direct a medium, such as ram air for example, through a portion of the environmental control system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first heat exchanger 34 and a second heat exchanger 36. Within the heat exchangers 34, 36 ram air, such as outside air provided via a scoop for example, acts as a heat sink to cool a medium passing there through.

The environmental control system 20 additionally comprises at least one compressing device 40. In the illustrated, non-limiting embodiment, the compressing device 40 of the environmental control system 20 is a mechanical device that includes components for performing thermodynamic work on a medium (e.g., extracts work from or applies work to the medium A by raising and/or lowering pressure and by raising and/or lowering temperature. Examples of the compressing device 40 include an air cycle machine, a three-wheel air cycle machine, a four-wheel air cycle machine, etc.

As shown, the compressing device 40 includes a compressor 42 and a turbine 44 operably coupled to each other via a shaft 46. The compressor 42 is a mechanical device that raises a pressure of a medium provided thereto and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The turbine 44 is a mechanical device that expands a medium and extracts work therefrom (also referred to as extracting energy). In the illustrated, non-limiting embodiment, the turbine 44 includes a plurality of inlet fluid flow paths, such as an inner flow path and an outer flow path, to enable mixing of multiple medium flows at the exit of the turbine 44. The inner flow path can be a first diameter, and the outer flow path can be a second diameter. In the compressing device 40, the turbine 44 drives the compressor 42 via the shaft 46. The fan 48 is a mechanical device that can force, via push or pull methods, a medium (e.g., ram air) through the shell 32 across the one or more ram heat exchangers 34, 36 and at a variable cooling to control temperatures.

The environmental control system 20 additionally includes at least one dehumidification system 50. In the illustrated, non-limiting embodiment, the dehumidification system 50 includes a condenser 52 and a water collector 54. The condenser 52 is a particular type of heat exchanger and the water collector 54 is a mechanical device that performs a process of removing water from a medium. The condenser 52 and the water collector 54 are arranged in fluid communication with the first medium A1. The configuration of the at least one dehumidification system 50 may vary.

The elements of the environmental control system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a first valve V1 is configured to control a supply of the medium A provided to the environmental control system 20. A second valve V2, also referred to herein as a bypass valve, may be operable to allow a portion of the medium to bypass the turbine 44 of the compressing device 40. As a result, operation of the second valve V2 may be used to add heat and to drive the compressing device 40 during failure modes.

The environmental control system 20 may be operable in a plurality of modes based on a flight condition of the aircraft. For example, the environmental control system 20 may be operable in a first mode when the ambient temperature is at or above a selected design point of the system 20. In the first mode of operation, valve V1 is opened to draw a high pressure, high temperature first medium A, such as bleed air, from a bleed source into the environmental control system 20. Examples of suitable sources of bleed air include, but are not limited to, an engine of the aircraft or an auxiliary power unit for example. The medium A flows through the inlet port 22 passes through an ozone converter, illustrated at 60, before being provided to the first heat exchanger 34. Within the first heat exchanger 34, the medium A is cooled via a flow of ram air. Embodiments where one or more other components, such as an outflow heat exchanger (not shown) for example, are positioned directly downstream from or upstream from the first heat exchanger 34 are also within the scope of the disclosure.

Downstream from the first heat exchanger 34, the medium A is separated in two distinct portions following two distinct flow paths. A first portion of the medium A, shown schematically at A1, flows to the dehumidification system 50 and a second portion of the medium A, illustrated at A2, is provided to the compressor 42. As shown, the first portion A1 of the medium is provided to the condenser 52 and the water collector 54 sequentially, so that any free moisture within the first portion A1 of the medium A is condensed and removed, to produce cool high-pressure air. This cool, high pressure first portion A1 of the medium then enters the turbine 44 through a second inlet or nozzle (e.g., a second nozzle).

The cool, high pressure first portion A1 of the medium is expanded across the turbine 44 and work is extracted therefrom. This extracted work drives the compressor 42 used to compress the second portion A2 of the medium. This extracted work also drives the fan 48, which is used to move air through the ram air circuit 30, and more specifically over the first heat exchanger 34 and second heat exchanger 36 (also known as ram air heat exchangers).

The act of compressing the second portion A2 of the medium A, heats the second portion A2. The compressed second portion A2 of the medium output from the compressor 42 enters the second heat exchanger 36 where it is cooled by ram air. In an embodiment, the second heat exchanger 36 is located upstream from the first heat exchanger 34 relative to a flow of ram air through the shell 32 of the ram air circuit 30. As the second portion A2 of the medium A is cooled within the second heat exchanger 36, the moisture within the second portion A2 of the medium condenses. Moisture is removed from the second portion A2 of the medium within a water extractor, illustrated at 62, before the second portion A2 of the medium is provided to a first inlet or nozzle of the turbine 44 of the compression device 40. The cool high pressure second portion A2 of the medium A is expanded across the turbine 44 and work is extracted therefrom.

The two portions A1, A2 of the air flow A are mixed together within or at an exit of the turbine 44. The combined first portion A1 and second portion A2 of the medium A leaves the turbine 44 and enters the condenser 52 to cool the first portion A1 of the medium output from the first heat exchanger 34. The combined first portion A1 and second portion A2 of the medium is then sent to one or more loads of the aircraft, such as to condition the volume 24.

The second mode of the environmental control system 20 is associated with operation of the system at ambient temperatures below the selected design point of the system 20. In the second mode of operation, the bypass valve V2 is at least partially open, thereby allowing the first portion A1 of the medium A output from the first heat exchanger 34 to bypass not only a portion of the dehumidification system 50, but also the turbine 44. In such embodiments, the first portion A1 of the medium A is mixed with the second portion A2 of the medium A downstream from an outlet of the turbine 44 before being provided to the condenser 52.

Aspects of the embodiments are described herein with reference to flowchart illustrations, schematics, and/or block diagrams of methods, apparatus, and/or systems according to embodiments. Further, the descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system of an aircraft comprising:
    a compressing device including:
        a turbine configured to receive a first flow of medium; and
        a compressor configured to receive a second flow of medium a distinct from the first flow;
    a ram air circuit including a ram air shell having at least one heat exchanger positioned therein, wherein the at least one heat exchanger is fluidly connected to the compressor and the turbine, wherein the second flow output from the at least one heat exchanger is provided directly to an inlet of the compressor;
    a dehumidification system in fluid communication with the turbine;
    a bypass valve configured to divert the first flow around the turbine; and
    an inlet port arranged in fluid communication with the compressor, the turbine, and the dehumidification system.

2. The environmental control system of claim 1, wherein the medium is separated into the first flow and the second flow downstream from the at least one heat exchanger.

3. The environmental control system of claim 1, wherein the compressing device includes a fan operably coupled to the compressor and the turbine via a shaft, the fan being arranged in fluid communication with the ram air circuit.

4. The environmental control system of claim 1, wherein a mixture of the first flow and the second flow is provided to a load, and the bypass valve is operable to control a temperature of the mixture of the first flow and the second flow provided to the load.

5. The environmental control system of claim 1, wherein the flow of medium is bleed air.

6. The environmental control system of claim 5, wherein the bleed air is provided from at least one of an engine and an auxiliary power unit of the aircraft.

7. The environmental control system of claim 1, wherein a third flow of the medium supplied via the inlet port is separated into the first flow and the second flow within the environmental control system, the first flow being supplied to the turbine and the second flow being supplied to the compressor.

8. The environmental control system of claim 7, wherein the turbine has a first inlet and a second inlet, the first inlet receiving the first flow and the second inlet receiving the second flow.

9. The environmental control system of claim 8, wherein the first flow mixes with the second flow at an exit of the turbine.

10. The environmental control system of claim 8, wherein the dehumidification system is positioned upstream from the first inlet of the turbine.

11. The environmental control system of claim 1, wherein the environmental control system is operable in a plurality of modes including a first mode and a second mode.

12. The environmental control system of claim 11, wherein the environmental control system is operable in the first mode when an ambient temperature is at or above a design point of the environmental control system.

13. The environmental control system of claim 11, wherein the environmental control system is operable in the second mode when an ambient temperature is below a design point of the environmental control system.

14. The environmental control system of claim 11, wherein the bypass valve is in a closed position during operation in the first mode and the bypass valve is in an open position during operation in the second mode.

15. A method of operating an environmental control system of an aircraft comprising:
   providing a flow of medium to the environmental control system including a compressor and a turbine;
   separating the flow of medium into a first portion and a second portion downstream of a heat exchanger of a ram air circuit; and
   providing the second portion to the compressor and the turbine sequentially, wherein the second portion is provided from an outlet of the heat exchanger directly to an inlet of the compressor;
   wherein in a first mode of operation, the first portion and the second portion of the flow of medium mix within or at an outlet of the turbine and
   in a second mode of operation the first portion bypasses the turbine such that the first portion and the second portion of the flow of medium mix downstream from the turbine.

16. The method of claim 15, wherein the environmental control system is transformed from the first mode of operation to the second mode of operation by opening a bypass valve.

17. The method of claim 15, wherein a temperature of the mixture of the first portion and the second portion generated in the first mode of operation is cooler than a temperature of the mixture of the first portion and the second portion generated in the second mode of operation.

18. The method of claim 15, wherein the flow of medium provided to the environmental control system is bleed air drawn from an engine of the aircraft.

* * * * *